(12) United States Patent
Lassaux et al.

(10) Patent No.: US 6,674,747 B1
(45) Date of Patent: Jan. 6, 2004

(54) SUBSCRIBER CARD, SUBSCRIBER CONNECTING UNIT AND RELAY CENTRE FOR CONCENTRATING INTERNET FRAMES

(75) Inventors: Jean Lassaux, Lannion (FR); Michel Levy, Gometz la Ville (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/380,249

(22) PCT Filed: Dec. 30, 1998

(86) PCT No.: PCT/FR98/02916

§ 371 (c)(1),
(2), (4) Date: Aug. 30, 1999

(87) PCT Pub. No.: WO99/35795

PCT Pub. Date: Jul. 15, 1999

(30) Foreign Application Priority Data

Dec. 31, 1997 (FR) .............................. 97 16812

(51) Int. Cl.[7] .............................................. H04L 12/66
(52) U.S. Cl. ..................... 370/352; 370/352; 370/466; 370/353

(58) Field of Search .................... 370/434, 352–356, 370/400–401, 419, 463, 389, 392, 353, 466

(56) References Cited

U.S. PATENT DOCUMENTS

| 4,970,721 A | * | 11/1990 | Aczel et al. ................... 370/92 |
| 5,521,914 A | * | 5/1996 | Mavraganis et al. .......... 370/60 |
| 5,828,666 A | * | 10/1998 | Focsaneanu et al. ........ 370/389 |

FOREIGN PATENT DOCUMENTS

| EP | 0 377 203 A1 | 7/1990 | |
| EP | 0 661 900 A2 | 7/1995 | |
| FR | 0556105 A1 | * 2/1993 | ........... H04B/10/20 |

* cited by examiner

Primary Examiner—Douglas Olms
Assistant Examiner—Robert W. Wilson
(74) Attorney, Agent, or Firm—Sughrue Mion, PLLC

(57) ABSTRACT

A subscriber card includes a controller for concentrating Internet frames so as not to occupy a telephone circuit for each call to an Internet service provider. The subscriber card is connected to a switching matrix that facilitates transmission of the concentrated Internet frames to a data transmission network. The subscriber card handles multiple subscriber inputs and statistically multiplexes data from the multiple subscriber inputs in order to increase throughput.

11 Claims, 5 Drawing Sheets

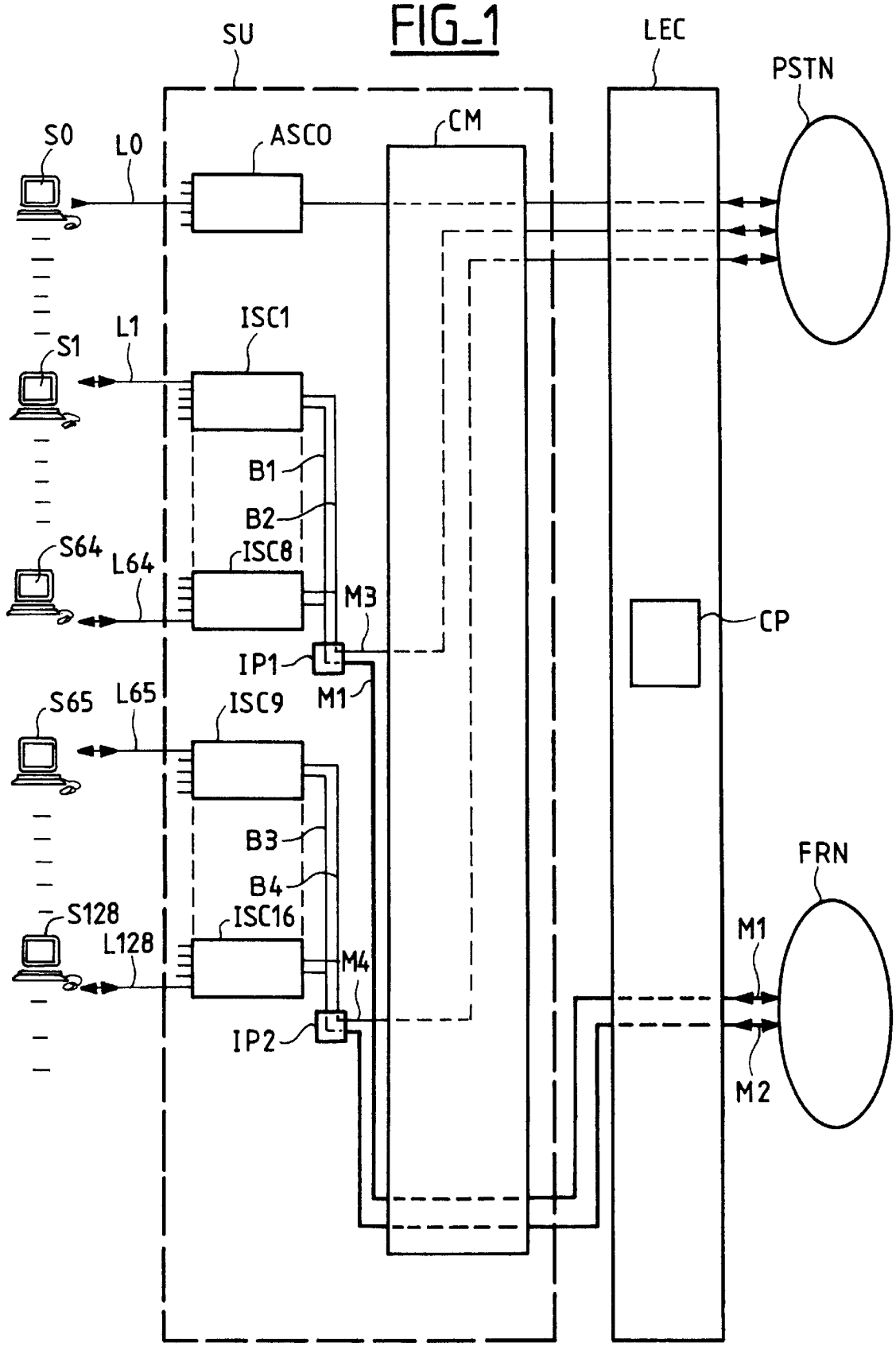

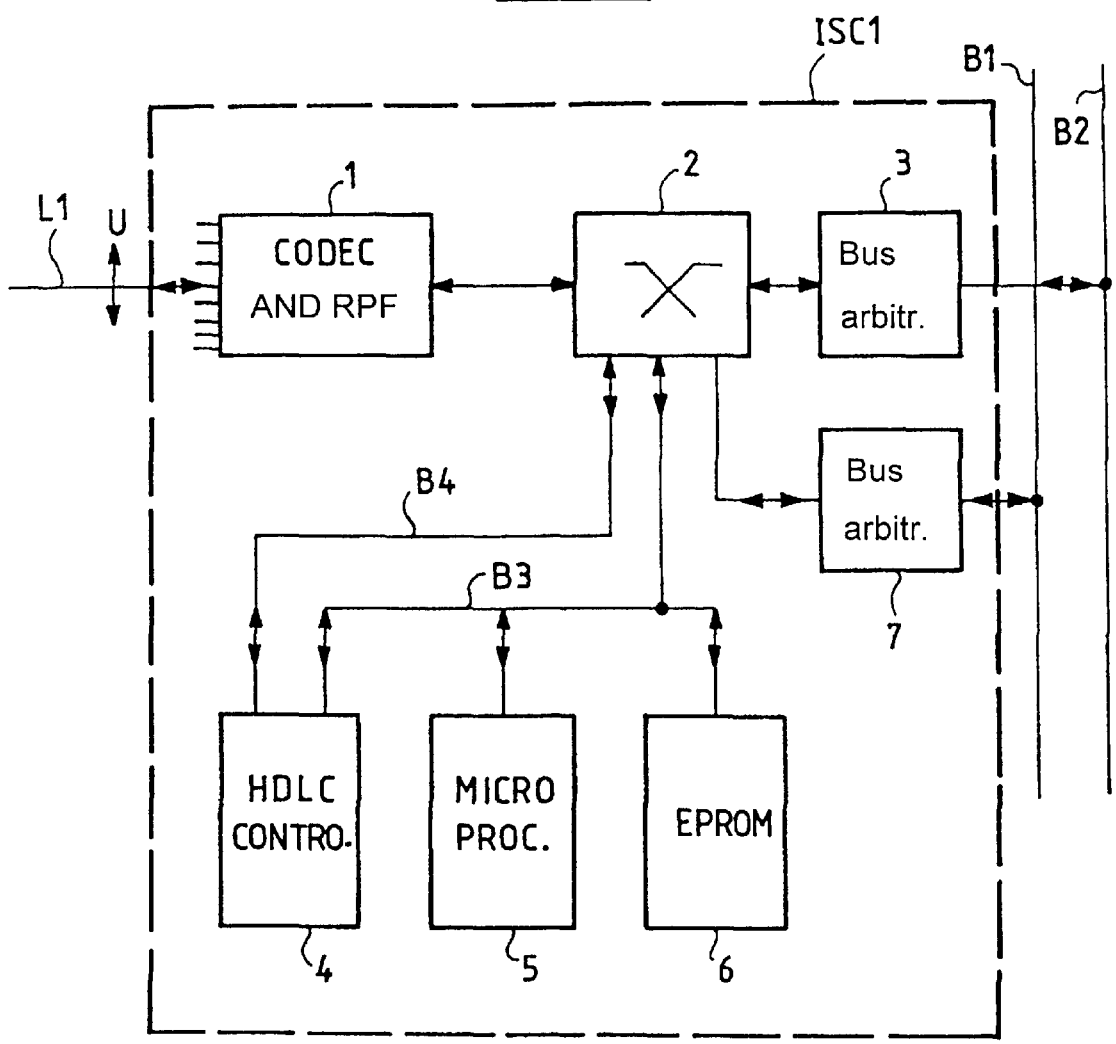

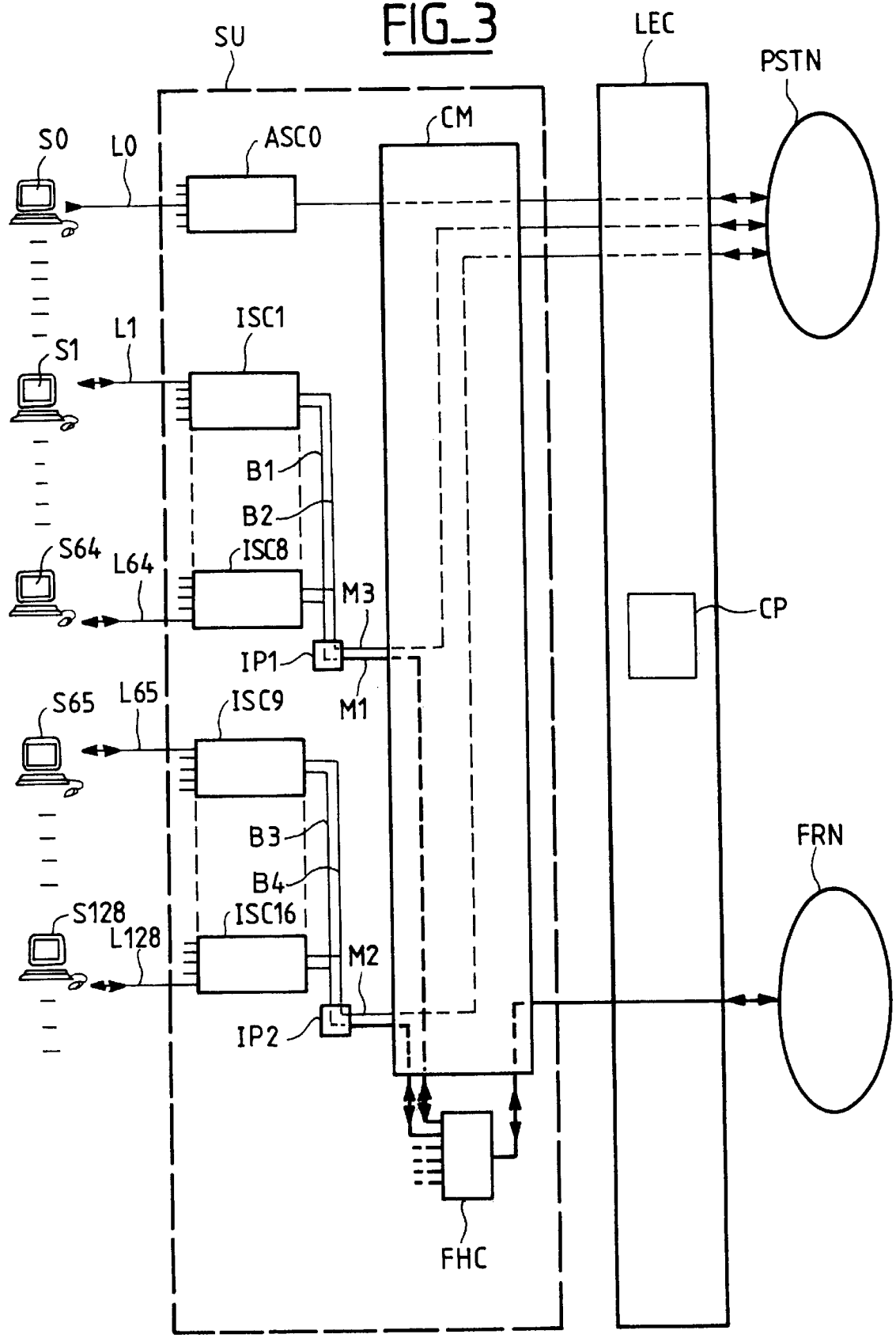

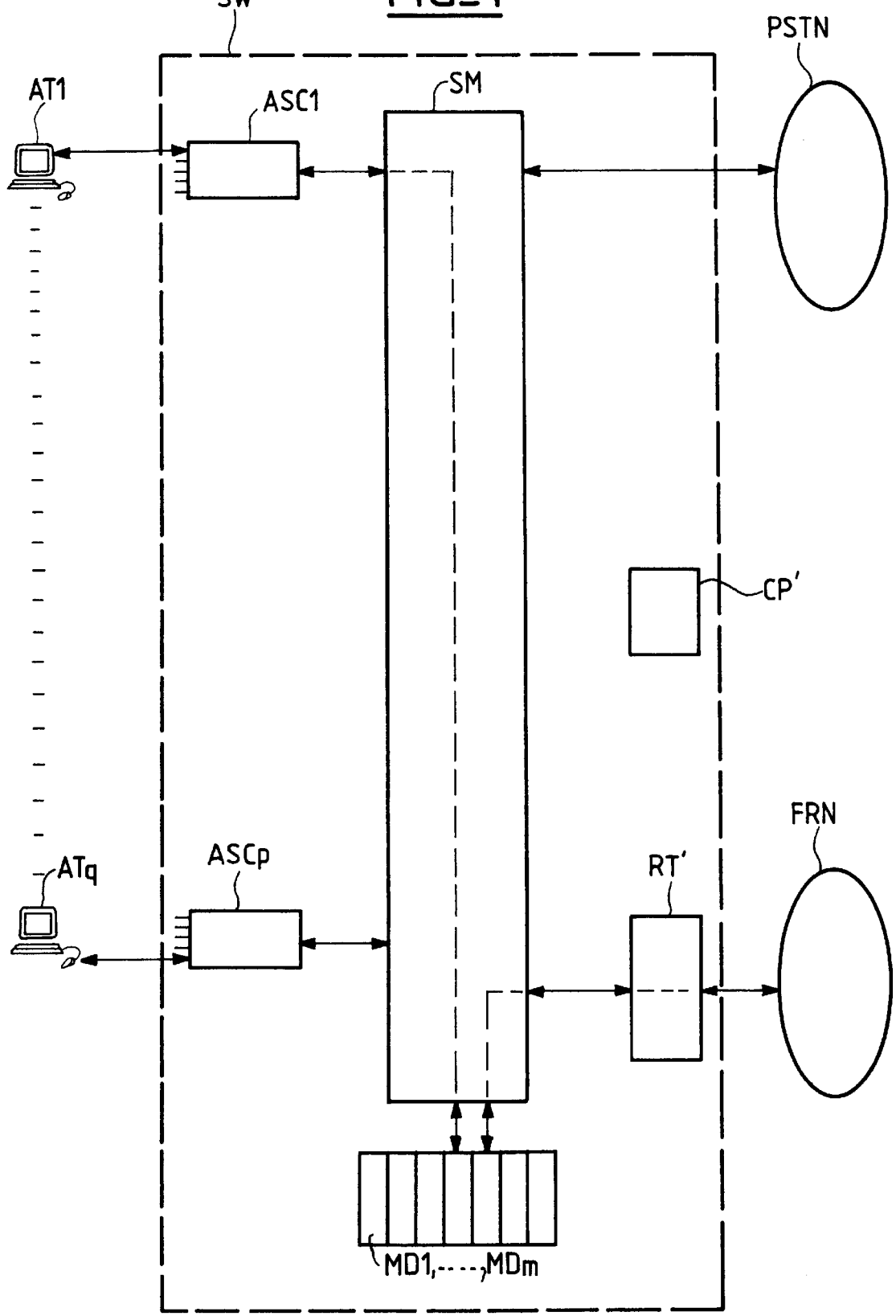

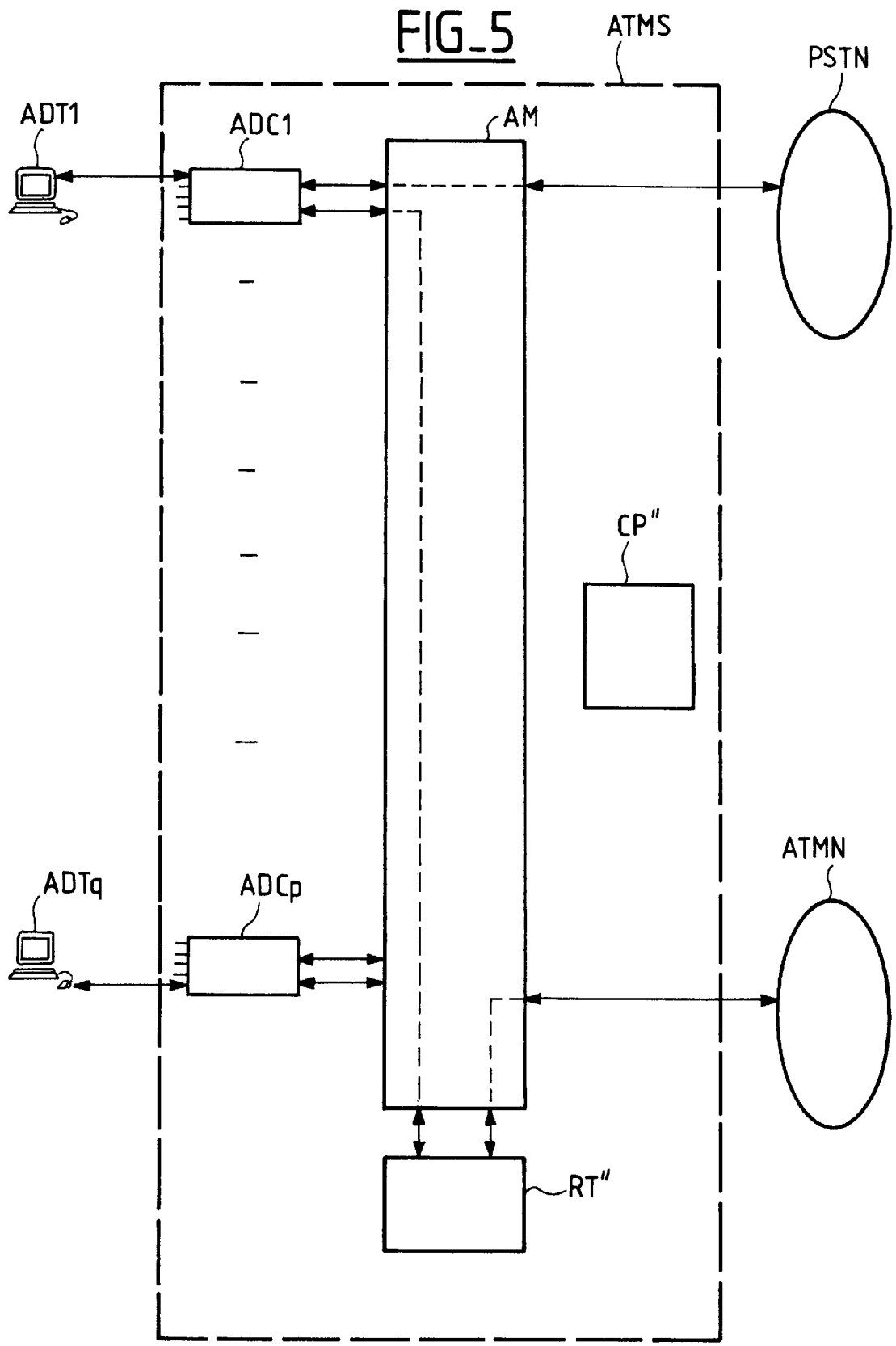

SUBSCRIBER CARD, SUBSCRIBER CONNECTING UNIT AND RELAY CENTRE FOR CONCENTRATING INTERNET FRAMES

BACKGROUND OF THE INVENTION

The invention concerns a subscriber card, a subscriber unit, and an exchange for concentrating Internet frames, i.e. frames conforming to the point-to-point transmission protocol and to the Internet protocol.

Many Internet users employ the public telephone network to access their service provider. Calls conveying data between an Internet service provider and a subscriber terminal via a standard telephone network are longer than standard telephone calls. On the other hand, the data is transmitted in bursts separated by long periods of inactivity.

In an analog telephone network, a subscriber terminal sends and receives Internet frames via a modem located near the terminal and another modem located near a server constituting an access point to a data transmission network. One particular type of modem, called an ATM/ADSL (Asynchronous Transfer Mode/Asymmetrical Digital Subscriber Loop) modem, transmits Internet frames having a high bit rate in the direction from the subscriber terminal to the network on an analog line in a frequency band above the telephone band.

In an Integrated Services Digital Network (ISDN), basic subscriber access is provided by:

two B channels each having a bit rate of 64 kbit/s, and
one D channel having a bit rate of 16 kbit/s and which is used to transmit data.

Each ISDN subscriber terminal is connected to a local exchange via a subscriber unit which can be at some distance from the exchange. Subscriber cards in the subscriber unit constitute the interface with the subscriber lines. When a subscriber uses the D channel to transmit data conventionally, the data is concentrated at the subscriber card by means of a circuit called a HDLC controller which implements the standard HDLC protocol, after which the concentrated data frames are switched in order to route them to a gateway providing access to a data frame switch.

When a subscriber uses a D channel to transmit Internet frames, those frames can be separated from frames dedicated to signaling and then routed without further processing, in the local exchange, to a node providing access to a data transmission network.

When a subscriber uses a B channel, or both B channels, to transmit Internet frames, those frames can be routed without further processing, in the local exchange, to a node providing access to a data transmission network. The access node is a remote node. It is located beyond the local exchange, or even beyond one or more transit nodes.

In an ISDN, a call to an Internet service provider occupies at least one B channel having a bit rate of 64 kbit/s but data is transmitted from the Internet service provider to the subscriber terminal at an average bit rate in the order of 5 kbit/s.

Whatever type of transmission is used between the subscriber terminal and the Internet service provider, the resources of the telephone network are therefore under-utilized. Also, Internet traffic is expanding fast. There is therefore a risk of telephone networks becoming congested by Internet traffic.

SUMMARY OF THE INVENTION

The aim of the invention is to propose a simple solution that can be implemented at low cost in existing or future exchanges.

A first aspect of the invention consists in a digital subscriber card for a telecommunication network including integrated services digital exchanges and data switches, characterized in that it includes:

first means for concentrating, on n×64 kbit/s data links, Internet frames from a plurality of digital subscriber lines before routing them to a data switch, and second means for receiving an instruction supplied by a call processor and for controlling the first means so as to concentrate Internet frames and transmit them in a virtual circuit routing them to a data switching center when said second means receive an instruction to that effect.

The subscriber card performs a first stage of concentration of Internet frames from a digital subscriber terminal as close as possible to the digital subscriber terminal. It therefore enables the resources of the subscriber unit in which the card is located and all resources downstream of it to be used more efficiently. This solution is particularly advantageous when applied to existing digital subscriber connection cards which incorporate frame concentrator means for the D channels, since all that is then required is to modify the control means of the concentrator means. In practice, the modification often consists in modifying the software stored in an electrically re-programmable memory.

A second aspect of the invention consists in a subscriber unit for a telecommunication network including integrated services digital exchanges and data switches, characterized in that it includes at least one digital subscriber card in accordance with the invention.

The subscriber unit is a low-cost unit because all that is required is to change the subscriber cards. It performs a first stage of concentration of Internet frames from digital subscriber lines. If it includes further concentrator means, it provides a second stage of concentration of Internet frames from a plurality of digital subscriber lines.

A third aspect of the invention consists in a subscriber unit, characterized in that it includes concentrator means for concentrating Internet frames from a plurality of analog subscriber lines.

The subscriber unit provides a first stage of concentration of Internet frames from analog subscriber lines.

A fourth aspect of the invention consists in an exchange adapted to be connected to at least one subscriber unit in accordance with the invention and including call processing means, characterized in that its call processing means include means for controlling Internet frame compressor means on digital subscriber cards in accordance with the invention.

The exchange is a low-cost exchange because all that is required is to modify the call processing software of a standard ISDN exchange.

A fifth aspect of the invention consists in an exchange connected to a data transmission network and including call processing means and a switch matrix, characterized in that it further includes an Internet router and in that the call processing means include means for controlling the matrix so that calls to an Internet service provider pass through the router.

A sixth aspect of the invention consists in a subscriber unit connected to a data transmission network and including a switch matrix, characterized in that it further includes an Internet router and in that the matrix can be controlled so that calls to an Internet service provider pass through the router.

A seventh aspect of the invention consists in an exchange connected to a data transmission network and including call processing means and a switch matrix, characterized in that it further includes a plurality of modems and in that the call processing means include means for controlling the matrix so that calls to an Internet service provider pass through the modems.

An eighth aspect of the invention consists in a subscriber unit connected to a data transmission network and including a switch matrix, characterized in that it further includes a plurality of modems and in that the switch matrix can be controlled so that calls to an Internet service provider pass through the modems.

The above exchanges and subscriber units extract Internet traffic from the telephone network as close to the subscriber card as possible, to spare the resources of the telephone network.

BRIEF DESCRIPTION OF THE DRAWINGS

The invention will be better understood and other features of the invention will become apparent with the assistance of the following description and the accompanying drawings:

FIG. 1 shows a block diagram of a first embodiment of an exchange and subscriber unit in accordance with the invention.

FIG. 2 shows a block diagram of an embodiment of the subscriber card in accordance with the invention.

FIG. 3 shows a block diagram of a second embodiment of an exchange and subscriber unit in accordance with the invention.

FIG. 4 shows a block diagram of an embodiment of the exchange in accordance with the invention more particularly suitable for analog subscriber terminals.

FIG. 5 shows a block diagram of an embodiment of an asynchronous transfer mode (ATM) exchange in accordance with the invention more particularly suitable for subscriber terminals incorporating an ADSL (Asymmetrical Data Serial Link) modem.

DETAILED DESCRIPTION OF THE INVENTION

The first embodiment of the exchange and subscriber unit, which is shown in FIG. 1, includes:
- a subscriber unit SU having input-output ports connected to subscriber terminals S0, . . . , S128 by respective subscriber lines L0, . . . , L128; and
- a local exchange LEC which can be at some distance from subscriber unit SU, to which it is connected by time-division multiplex links; exchange LEC includes a call processor CP which essentially consists of a processor executing software; exchange LEC is connected to a standard telephone network PSTN and to a frame relay data transmission network FRN.

Subscriber unit SU includes:
- a plurality of subscriber cards, including analog cards like card ASC0 and digital cards like cards ISC1, . . . , ISC16, each subscriber card being connected to eight subscriber terminals of the same kind,
- two bus interface circuits IP1 and IP2, and
- a connection matrix CM.

For example, analog subscriber terminal S0 is connected to subscriber card ASC0 by a line L0. Card ASC0 digitizes analog signals from terminal S0, whether they are voice signals or digital signals converted to analog form by a modem. In the opposite transmission direction, it decodes and converts to analog form a digital signal from the PSTN or from the FRN. An input-output port of card ASC0 is connected to an input-output port of matrix CM which concentrates traffic from subscriber terminals and transmits it to local exchange LEC.

Digital subscriber cards ISC1, . . . , ISC16 are identical and combined in groups of eight. Cards ISC1, . . . , ISC8 are connected to a bus B1 and to a bus B2 which terminate at bus interface circuit IP1. Circuit IP1 is the interface between bus B1 and a point-to-point link M1 and between bus B2 and a point-to-point link M3. In the embodiment shown in FIG. 1, each bus B1 and B2 is used to transmit data frames and voice signal samples. Circuit IP1 is connected to data transmission network FRN via connection matrix CM and local exchange LEC.

Link M1 connects circuit IP1 to connection matrix CM. It is a high bit rate (N×64 kbit/s) synchronous time-division multiplex link dedicated to data frames. Link M3 connects circuit IP1 to connection matrix CM. It is a 2 Mbit/s point-to-point link dedicated to voice samples.

Having link M1 pass through connection matrix CM and local exchange LEC has two advantages:
- (30-N) circuits on bus B1 can be used to transmit voice samples, and
- data links at n×64 kbit/s can be multiplexed onto 2 Mbit/s link M1 to data transmission network FRN.

In variants of the above embodiment, circuit IP1 is connected to data transmission network FRN directly or via only local exchange LEC or via only connection matrix CM. If circuit IP1 is connected directly to data transmission network FRN, buses B1 and B2 are respectively dedicated to transmitting data and transmitting voice samples.

Cards ISC8, . . . , ISC16 are connected to a bus B3 and to a bus B4. These are synchronous passive buses, similar to buses B1 and B2, and terminate at bus interface circuit IP2. Circuit IP2 is connected to connection matrix CM by links M2 and M4 similar to links M1 and M3, respectively.

Digital subscriber terminal S1 is connected to subscriber card ISC1 by a line L1, for example.

FIG. 2 shows one example of subscriber card ISC1 in the form of a block diagram. It includes:
- a line encoder-decoder circuit 1 for signals transmitted in subscriber line B channels (2B1Q encoding, for example) which also provides a remote power feed for eight digital subscriber terminals, this circuit 1 having respective first input-output ports connected to eight subscriber lines, of which only line L1 is shown,
- a collision detection and conflict resolution (CSMA-CR) bus arbitration circuit 3 connected to a bus B2 external to the card,
- a CSMA-CR bus arbitration circuit 7 connected to a bus B1 external to the card,
- an HDLC controller 4 implementing the standard HDLC (High Level Data Link Control) protocol on at least 32 channels,
- a microprocessor 5,
- an EPROM 6 storing the software executed by processor 5,
- a switch matrix 2 having input-output ports respectively connected to the second input-output port of encoder-decoder and remote power feed circuit 1 and to input-output ports of arbitration circuits 3 and 7,
- a bus B3 internal to the card and connecting input-output ports of matrix 2, HDLC controller 4, microprocessor 5 and memory 6, and
- a bus B4 internal to the card and connecting an input-output port of matrix 2 to an input-output port of HDLC controller 4, bus B4 transmitting data to and from 32 HDLC channels in a time-division multiplex with 32 time slots in each direction.

HDLC controller 4 is a monolithic integrated circuit available off the shelf. On a subscriber card connected to eight subscriber lines, two HDLC channels are used for signaling functions internal to exchange LEC and to subscriber unit SU, eight HDLC channels are respectively allocated to the eight D channels used by the eight subscriber lines connected to the card, and twenty-two are available in the case of standard use of the subscriber cards.

The invention uses these available HDLC channels to concentrate Internet frames. There is no need to add any hardware to the card for this. Processor 5 executes software enabling it to receive instructions from call processor circuit CP via standard signaling links that are not shown. The software executed by processor 5 is adapted so that it can control HDLC controller 4 to compress Internet frames on the instruction of call processor CP. The scope of the invention is not limited to the situation in which the call processor is in the local exchange. Operation would be entirely similar if it were at the subscriber unit.

When a subscriber terminal, for example terminal S1, requests call set up to an Internet service provider, the request is detected by call processor CP of local exchange LEC on the basis of two criteria:

the called number corresponds to an Internet service provider.

the bearer capability information element field of the SETUP message from the subscriber terminal indicates a data call using the Internet protocol stack.

Call processor CP of local exchange LEC then requests processor 5 on subscriber card ISC1 to command switch matrix 2 to connect the B channel to be used for the call to one of the 22 available HDLC channels of HDLC controller 4. It also provides it with a data link connection identifier for the call being set up.

When an Internet frame arrives from subscriber line L1, HDLC controller 4 prepares an Internet data frame in accordance with a frame relay protocol, for example the LAPF protocol (the LAPD protocol could also be used). Also, a D channel is connected permanently to one HDLC channel of HDLC controller 4 to carry the signaling associated with the calls, in the conventional way.

Call processor CP allocates a virtual circuit to each call to an Internet service provider. Thus each Internet frame is transmitted in a virtual circuit corresponding to an Internet service provider.

When controller 4 has finished preparing an LAPF frame from the Internet frames supplied by a subscriber line, processor 5 writes that frame into a queue, a respective queue being provided for each B channel. Controller 4 reads these LAPF frames with a circular priority and writes them into an output queue to a pre-established data channel (in semi-permanent mode) consisting of N concatenated 64 kbit/s circuits carried by bus B1, for transmission over link M1 at a high bit rate. The circular priority mechanism gives all subscriber cards equal chance of accessing bus B1.

The concentrated Internet frames are placed on multiplex link M1 via interface circuit IP1. Link M1 transmits them to a switch providing access to data transmission network FRN. Lines M1 and M2 are semi-permanent multiplex transmission lines and each of them has a high bit rate chosen in accordance with the results of a statistical traffic study. Link M1, for example, is common to transmission of Internet frames from the various subscriber lines L1, . . . , L64. The Internet frames are statistically multiplexed. Internet frame traffic is therefore concentrated at the level of each subscriber card. There is no physical circuit permanently allocated in subscriber unit SU or exchange LEC for each user terminal connected to an Internet service provider. This prevents under-use of their resources.

Controller 4 encapsulates B channel frames for the transmission direction from the subscriber terminal to data transmission network FRN. The encapsulation can be of either of two types, depending on the data link interface used to access the data transmission network and to access the Internet service provider's network access server:

Direct encapsulation, in frames suitable for frame relay: controller 4 receives frames conforming to the point-to-point protocol (PPP) and encapsulates them in frames conforming to the LAPF protocol (ITU-T recommendation Q.922 and IETF document rfc1973). A temporary virtual circuit is therefore established for each call to an Internet service provider. The frame relay signaling procedure for these switched virtual circuits conforms to ITU-T recommendation Q.933.

Encapsulation in a frame relay tunnel, by multiplexing PPP sessions: each call to an Internet service provider creates a PPP session between the subscriber terminal and its service provider when a physical or logical connection is established between them. Encapsulation then consists in multiplexing packets relating to different calls with the same Internet service provider on the same virtual circuit using the point-to-point protocol. A semi-permanent virtual circuit is therefore created on an N×64 kbit/s data link which terminates at an Internet service provider. A tunnel is therefore created in the semi-permanent virtual circuit to support multiplexing of different PPP calls relating to the same Internet service provider. A call identifier is allocated to each call to an Internet service provider and is placed in the header of the encapsulation frame to enable PPP packets to be identified. The layer 2 tunneling protocol (L2TP), which is in process of becoming a de facto standard at the IETF, is one example of a communication protocol which can be used between Internet service providers and the HDLC controller that concentrates the Internet frames.

For the transmission direction from the subscriber terminal to data transmission network FRN, controller 4 transmits LAPF frames without modifying them.

PPP frames supplied by a B or D channel are allocated to a frame relay virtual connection set up on a high bit rate data link, e.g. link M1 or M2, to be transmitted to data transmission network FRN. The data interface used in data transmission network FRN is a frame relay network-user interface conforming to ITU-T recommendation X.36 or to frame relay forum implementation agreement FRF.4.

Controller 4 carries out this encapsulation for the transmission direction from exchange LEC to the B channels of a subscriber terminal. LAPF frames received by a subscriber card, e.g. card ISC1, are recognized by the destination card by means of an identification system provided as standard in HDLC controller 4 and which reads an address field in the header of each LAPF frame.

For the transmission direction from exchange LEC to the D channels of a subscriber terminal, HDLC controller 4 transmits LAPF frames and distributes them to the D channels of the subscriber terminals in accordance with the data link connection identifier (DLCI) at the start of the frame. Each frame is transmitted by a semi-permanent virtual connection.

FIG. 3 shows a block diagram of a second embodiment of a switching center and subscriber unit in accordance with the invention. The units which are similar to those of the first embodiment are identified by the same reference numerals. The second embodiment differs from the first one in that the data links at N×64 kbit/s carried by the high bit rate links M1 and M2 are not terminated by data transmission network FRN, but instead by a concentrator FHC in subscriber unit SU which constitutes an additional stage of concentration of Internet frames. The high bit rate links carried by links M1 and M2, and other similar links from other groups of subscriber cards, not shown, are respectively connected to input-output ports of concentrator FHC by connection matrix CM. Matrix CM connects an input-output port of concentrator FHC to an input-output port of local exchange LEC, which connects that output to data transmission network FRN.

In both of the previous embodiments, calls between analog subscriber terminals (having a modem) and Internet service providers are processed conventionally, i.e. as voice circuits.

FIG. 4 shows a block diagram of one embodiment of a local switching center SW in accordance with the invention that is more particularly suitable for analog subscriber terminals. In this embodiment, the analog subscriber terminal lines AT1, . . . , ATq terminate at subscriber cards ASC1, . . . , ASCn which are in a local switching center SW and not in a subscriber unit. Local switching center SW includes:

p analog subscriber cards ASC1, . . . , ASCp each connected to eight analog subscriber terminals, for example, a switch matrix SM using the synchronous time-division switching technique, a call processor CP', a set of modems MD1, . . . , MDm connected to the switch matrix by a high bit rate (n×64 kbit/s in each direction) synchronous time-division multiplex digital link, and a router RT (which is optional) connected to a frame relay data transmission network FRN and having Internet routing functions which are normally provided by a router on the premises of the Internet service provider.

Each analog subscriber card ASC1, . . . , ASCp has the standard functions of converting an analog signal into a digital signal at 64 kbit/s in the case of signals from subscriber terminals and converting data into digitized analog signals at 64 kbit/s in the case of signals from the network. The set of modems MD1, ... , MDm has an input-output port for digitized analog signals and an input-output port for data.

When a subscriber terminal, e.g. terminal AT1, requests call set up to an Internet service provider, call processor CP' of local switching center SW detects the request because the called number corresponds to the Internet service provider.

Call processor CP' commands switch matrix SM:
  to connect the input-output port of card ASC1 to the digitized analog signal input-output port of one of the modems MD1, . . . , MDm, allocating it a time slot, and
  to connect the data input-output port of that modem to a data link which is connected either to the input of router RT, if it is present, or directly to data transmission network FRN, otherwise.

Because the set of modems MD1, . . . , MDm is as close as possible to the subscriber cards, circuit-packet conversion is carried out precociously. In the network to subscriber terminal transmission direction, packet-circuit circuit conversion is done as late as possible. This has the advantage of minimizing occupancy of resources by Internet calls.

The block diagrams would be similar if the subscriber cards were in an analog subscriber unit remote from local switching center SW. In one embodiment, the set of modems can then be integrated into the subscriber unit so that they are as close as possible to the subscriber cards.

FIG. 5 shows a block diagram of one embodiment of an asynchronous transfer mode (ATM) switching center ATMS in accordance with the invention, which is more particularly suitable for analog subscriber terminals which have ATM/ADSL modems.

Switching center ATMS includes:
  a plurality of ATM/ADSL subscriber cards ADC1, . . . , ADCp each of which is connected, for example, to eight analog subscriber terminals ADT1, . . . , ADT8 each of which has an ATM/ADSL modem,
  an ATM switch matrix AM,
  a call processor CP", and
  a router RT'" (which is optional) connected to an ATM data transmission network ATMN; router RT'" has data network termination and Internet routing functions that are normally executed by a router on the premises of the Internet service provider.

Each subscriber card ADC1, . . . , ADCp has the functions of an ATM/ADSL modem. It filters signals from the subscriber line to separate the telephone band from the data band. It converts an analog signal into packets conveyed by an ATM virtual circuit in the case of signals from subscriber terminals and packets from the network into a digitized analog signal. It also statistically multiplexes data from different terminals connected to the same card and de-packets and time-division demultiplexes data from the network addressed to subscriber terminals.

Each card ADC1, . . . , ADCn has a first input-output port for analog voice signals and a second input-output port for packets conveying Internet frames. These two input-output ports are connected to respective ports of matrix AM. In conjunction with router RT'", matrix AM routes packets carrying voice samples to telephone network PSTN and packets carrying Internet frames to data transport network ATMN.

A variant connection of subscriber terminals with ATM/ADSL modems uses access systems independent of the switching center. The interfaces between these systems and the switching center are then:
  N×2 Mbit/s links carrying analog and ISDN signals, and
  ATM interfaces carrying ATM/ADSL subscriber terminal data links.

The switching center then processes the signals in a similar manner to when the ATM/ADSL subscriber cards are integrated into the switching center.

When a subscriber terminal, e.g. terminal ADT1, requests call set-up to an Internet service provider via the ATM/ADSL data link, call processor CP" of local switch ATMS detects the request because the called number corresponds to an Internet service provider.

Call processor CP" commands switch matrix AM:
  to connect the first input-output port of card ADC1 to telephone network PSTN,
  to connect the second input-output port (ATM input-output port) of card ADC1 to an input-output port of router RT'", and
  to connect another input-output port of router RT'" to data transmission network ATMN.

Traffic in the network is optimized because all of the above operations are carried out on the subscriber card in the local switching center. This has the advantage of minimizing occupancy of resources by Internet calls.

In this example no ISDN subscriber cards or analog subscriber cards are shown, but they could also be provided.

The subscriber lines terminate at subscriber cards at a switching center ATMS, and not in a remote subscriber unit, but there could also be subscriber units remote from the local switching center. The block diagrams would be similar if the subscriber cards were in a remote subscriber unit. It should be noted that router RT" and the associated service management software can be common to all types of subscriber. The switching center in accordance with the invention treats in a similar manner all types of subscriber: analog, digital (ISDN), ADSL, mobile phone, etc.

What is claimed is:

1. A digital subscriber card for a telecommunication network, the digital subscriber card comprising:

a first means for concentrating Internet frames from a plurality of digital subscriber lines on n×64 kbit/s data links prior to transmitting the concentrated Internet frames through a virtual circuit to a data switch, and a second means for receiving an instruction supplied by a call processor to concentrate the Internet frames received from the plurality of digital subscriber lines and for controlling the first means concentrating and transmitting the Internet frames through the virtual circuit to the data switch, wherein the first means concentrates Internet frames received from a plurality of digital subscriber lines according to a predetermined frame relay protocol and stores the concentrated Internet frames into a queue, and the first means reads the concentrated Internet frames from the queue with circular priority.

2. A subscriber card according to claim 1, wherein the first means comprise a concentrator for concentrating a plurality of data channels conforming to the HDLC protocol.

3. A subscriber card according to claim 1, further comprising:

a first carrier detect and collision resolution backplane interface circuit coupled to the first means and coupled to a first bus, and a second carrier detect and collision resolution backplane interface circuit coupled to the first means and coupled to a second bus.

4. A subscriber unit for a telecommunication network, comprising:

a plurality of digital subscriber cards according to claim 1, and a concentrator means for concentrating Internet frames already concentrated by the first means on each of the plurality of digital subscriber cards.

5. The digital subscriber card according to claim 1, wherein the predetermined frame relay protocol is LAPF.

6. The digital subscriber card according to claim 1, wherein the predetermined frame relay protocol is LAPD.

7. A telecommunications apparatus comprising:

at least one subscriber unit that comprises at least one digital subscriber card according to claim 1; and an exchange coupled to the least one subscriber unit, wherein the exchange comprises a call processor means that, when there are multiple calls to an Internet service provider, sends the instruction to the at least one digital subscriber card to concentrate Internet frames.

8. A subscriber unit for a telecommunication network, comprising:

a plurality of digital subscriber cards according to claim 1, and a frame concentrator for concentrating Internet frames already concentrated by the controller on each of the plurality of digital subscriber cards.

9. A digital subscriber card for a telecommunication network, the digital subscriber card comprising:

a controller for concentrating Internet frames from a plurality of digital subscriber lines on n×64 kbit/s data links prior to transmitting the concentrated Internet frames through a virtual circuit to a data switch, and a processor for receiving an instruction supplied by a call processor to concentrate the Internet frames received from the plurality of digital subscriber lines and for commanding the controller concentrating and transmitting the Internet frames through the virtual circuit to the data switch, wherein the controller concentrates Internet frames received from a plurality of digital subscriber lines according to a predetermined frame relay protocol and stores the concentrated Internet frames into a queue, and the controller reads the concentrated Internet frames from the queue with circular priority.

10. A subscriber card according to claim 9, wherein the controller concentrates a plurality of data channels conforming to the HDLC protocol.

11. A subscriber card according to claim 9, further comprising:

a first carrier detect and collision resolution interface circuit coupled to the controller and coupled to a first bus, and a second carrier detect and collision resolution interface circuit coupled to the controller and coupled to a second bus.

* * * * *